Oct. 14, 1930.  J. H. MORROW  1,778,429
CONVEYING SYSTEM
Filed Sept. 1, 1928
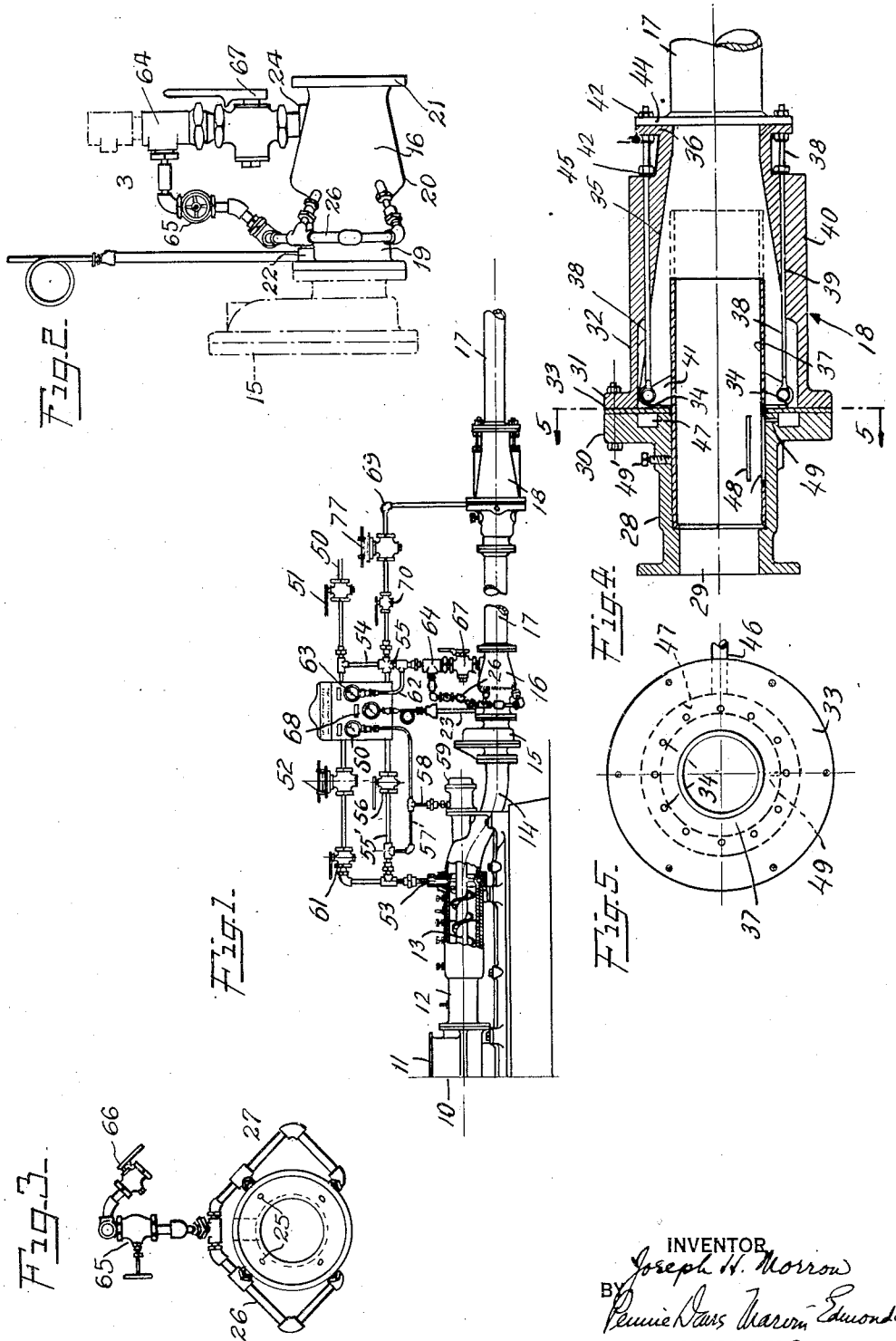

Patented Oct. 14, 1930

1,778,429

UNITED STATES PATENT OFFICE

JOSEPH HUMPHREYS MORROW, OF CATASAUQUA, PENNSYLVANIA, ASSIGNOR TO FULLER COMPANY, OF CATASAUQUA, PENNSYLVANIA, A CORPORATION OF PENNSYLVANIA

CONVEYING SYSTEM

Application filed September 1, 1928. Serial No. 303,585.

This invention relates to the conveying of pulverulent or finely divided materials, such as cement, cement raw material, pulverized coal, soda ash, etc., and is concerned more particularly with a method and apparatus by which relatively dense pulverized materials may be conveyed in pipe lines over long horizontal distances. The invention involves certain improvements on and modifications of the method and apparatus described and claimed in the Kinyon Patents Nos. 1,553,539, September 15, 1925; 1,652,281, December 13, 1927, and 1,677,119, July 10, 1928.

In the preferred form of the Kinyon system described in the patents above identified, the material to be conveyed is introduced into a casing connected to the pipe line and is advanced for a short distance by a device such as an impeller screw which causes the material to be compacted near the end of the screw to form a dense seal. Slightly beyond the end of the screw compressed air is introduced into the material, and is prevented by the seal from flowing backwardly along the flights of the screw. The primary function of the air so admitted is to change the characteristic of the material by aeration from a relatively inert mass to a semifluid which is forced through the pipe line to the discharge point under the pressure of the screw acting against the advancing column of material and by the normal expansion of the air.

Under normal conditions of material density and distance of conveying, the material will flow as a solid column. Under certain other conditions, however, when relatively dense materials are to be conveyed over long horizontal distances, that is, approaching and exceeding 1000 feet, there is sometimes a tendency for the air and material to stratify. I have observed that when this takes place the materials at the bottom of the pipe line are relatively dense and sluggish, the materials immediately above these lower layers are less dense and tend to move with a greater velocity, and in the extreme top section of the pipe line the air has a tendency to free itself at a relatively higher velocity carrying a certain amount of material with it. Slightly beyond the point where stratification has taken place, the material flow pulsates as air pockets form in the pipe line. Alternate compression and expansion then takes place as the advancing material column compresses the air pockets until the resistance to flow is overcome whereupon expansion takes place and velocity decreases.

In long systems handling large quantities of dense materials it will be apparent that the high static resistance of the pipe line, the relatively high pressure within the pipe line at the inlet end and the velocities involved require the admission of an excess volume of air at a pressure considerably higher than that of the pipe line to break down the seal of dense mass of material and render it fluent. This excess of air aggravates the tendency for the material and air to stratify in the long horizontal sections of the system.

The use of these pressures to break down the mass which is of relatively high density due to the static resistance of the system, necessarily causes a reaction against the impeller screw with the result that the power input to the driving motor is high.

It is an object of my invention to reduce the total power requirement both for compressing the air and driving the motor and to overcome the disadvantages due to pulsation by modifying the method of admitting the air.

In general, my method consists in admitting air into the material at the usual point slightly beyond the impeller screw at the minimum pressure and volume necessary to break up the dense seal and to permit the material to be forwarded a short distance beyond the air ring through which the air is admitted. At this point in the line a section of it is expanded for a short distance to form a chamber into which air is admitted at higher pressure and in volume sufficient to aerate the material completely. The volume of air so admitted need not be sufficient, however, to keep the material in a fluent condition throughout the entire length of the system. Then at one or more intermediate points in the line the remainder of the air required is admitted to break up the stratification and re-create the fluent condition. The air so admitted is injected into the system by a device which prevents excessive back pressure and since there is a decrease in internal pressure in the system toward the discharge end the pressure and volume of air admitted at the intermediate points can be kept at a minimum.

The position of the means for admitting air at the intermediate points can be determined in two ways. The simplest method is to start the apparatus by admitting all of the air required for the proper operation of the system at the air ring, that is, adjacent to the impeller screw, this method being exactly in accordance with the disclosure in the Kinyon patents. The next step is to determine the point in the pipe line where pulsations are taking place. As these pulsations are audible they can be determined very quickly. The aerating device is then installed in the pipe line a few feet nearer the inlet end than the point where pulsations are first apparent. The point or points of intermediate air admission can also be determined by installing pressure gauges at various points along the pipe line. Vibration of the index pointers indicates pulsation. After the necessary aerating devices are installed, the minimum air requirement is determined by regulation of pressure reducing valves in the compressed air pipe line.

I am aware that it has been proposed to install so-called "boosters" in pipe lines of simple blowing systems, in which material to be conveyed is transported by air pressure, the material being held more or less in suspension. These arrangements, however, are inoperative in connection with the system herein described, because as there is a reaction in both directions, the back pressure considerably increases the power required for rotating the impeller screw and the excess of air causes pulsation or "slugging" in the pipe line. In addition, the capacity of the system to handle material is very considerably reduced and the increased cost of operation is prohibitive. In addition, the excess of air causes sand blasting of the pipe line and pipe bends which raises maintenance costs to a prohibitive point.

For a better understanding of the invention, reference will be made to the accompanying drawings, in which:

Figure 1 is a schematic arrangement of the apparatus;

Figure 2 is a detail of the expansion chamber;

Figure 3 is a section view on line 3—3 of Fig. 2;

Figure 4 is a partial sectional view of an intermediate pipe line aerating device; and Figure 5 is a section on line 5—5 of Fig. 4.

Referring now to the drawings, and first to Fig. 1, the apparatus is shown to consist of a pulverized material pump 10 of a type such as that shown in Kinyon Patent No. 1,677,119. Pulverized material is delivered from the source of supply to the hopper 11 and is advanced through the barrel 12 by the usual differential pitch screw 13. The screw compacts the material as it is advanced, due to the decrease in pitch toward its discharge end, forming the usual dead seal space beyond the end of the screw.

The barrel 12 opens into an offset discharge section or elbow 14 to which a pipe line cutoff valve 15 is secured at its forward end, and an expansion and aerating chamber 16 is provided between the cutoff valve 15 and the transport pipe line 17. At one or more other points in the pipe line remote from the pump an intermediate aerating device 18 may be installed to prevent stratification of the material and air.

As shown in detail in Figures 2 and 3, the expansion and aerating chamber 16 consists of a cylindrical section 19 which expands abruptly to its greatest diameter at 20 and gradually decreases to a diameter equivalent to that of the pipe line near the end flange 21 by which it is secured to the end of the line. An inlet 22 formed in the upper side of the chamber communicates with a pressure standpipe 23 and an inlet 24 is provided to admit air at full pressure and volume for blowing the transport line free of material when the pump is stopped and the cutoff valve 15 is closed. A part of the air for creating the fluent condition is admitted to the chamber through a plurality of apertures 25 communicating with the air supply system through the branch pipes 26 and 27 and their connections.

An intermediate aerating device for the pipe line is shown in detail in Figures 4 and 5. It consists of a barrel section 28 having a hollow central bore 29 of the same internal diameter as the pipe line and is connected by an end flange 30 to the flange 31 on a barrel section 32. Between these flanges is a disc 33 provided with a plurality of apertures 34. The section 32 has a conical bore 35 of greater diameter than the line near the flange 31 and decreasing gradually to the pipe line internal diameter near the flange 36. A movable nozzle 37 is disposed within an enlarged section of the bore 29 to form an extension of the pipe line and this nozzle may be moved by rods 38 which pass through bores 39 in webs 40 formed on the outer wall of the barrel section 32 and are connected to webs 41 on the outer wall of nozzle 37. The position of the nozzle may then be adjusted by means of nuts 42 bearing against flanges 36 and 44 on the end of section 32 and the end of the pipe line, respectively. Stuffing boxes 45 seal the bores 39 and prevent the escape of air to the atmosphere around the rods 38, Compressed air is admitted to the device through an inlet 46 (Fig. 5) which communicates with an annular air channel 47 formed as a recess in the flange 30, the major portion of the air so admitted discharging into the bore 35 through apertures 34. As the material density is greatest in the lowermost portion of the pipe line, a plurality of slots 48 are formed at or near the bottom of the nozzle 37 and receive air through inlets 49 which lead to the annular air channel 47, these slots allowing the free passage of air regardless of the position of the nozzle 37. When the most favorable position of the nozzle 37 has been determined, it is secured in position by the set screw 49'.

Referring again to Fig. 1, in which the air piping layout is shown, air is supplied through the pipe line 50 from any suitable source of supply under the control of valve 51. A reducing valve 52 in line 50 controls the pressure of the air admitted to the usual air ring 53 of the pump. The branch line 54 extends downwardly from the line 50 and leads to the cross 55 to which is connected a line 55' leading through cutoff valve 56 to the air ring 53. A branch line 57 from the line 55' leads to a connection 58 through which air is admitted to the pump barrel along the screw shaft 13 between the barrel and the bearing housing 59 to exclude dust from the bearing and to react against the air admitted through air ring 53. The branch line 57 leads to a pressure gauge 60 which indicates the pressure of the air admitted both through the air ring and along the shaft. Valve 61 between the reducing valve 52 and air ring 53 may be closed and valve 56 opened if it is desired to by-pass the reducing valve and admit air under full pressure to the pump itself.

In the line 54 below the cross 55 a connection 62 is made to pressure gauge 63 which indicates the full pressure of the air supply. The connection 54 extends downwardly to T 64 shown enlarged in Figure 2, to admit air to the expansion chamber through the connections 26 and 27 under the control of valve 65. A valve 66 (Fig. 3) is placed in an outlet line from the connection to the valve 65, the valve 66 being normally kept closed and merely serving as an outlet for eliminating water from the air supply system. Below the T 64 is valve 67, through which air from line 54 passes into the inlet 24 of the chamber 16. This valve is normally kept closed and is opened momentarily only when the system is shut down to blow the system free of material. This is essential to prevent materials from returning to their inert condition in the pipe line when the system is shut down with the line full. The standpipe 23 is connected to gauge 68 which indicates the internal pressure of the pipe line when the system is in operation. It has a second function of indicating when the pipe line has been blown free of material, as described above, by returning to its zero point. Air is conducted to the intermediate aerating device 18 through pipe line 69 connected to the cross 55 under control of cutoff valve 70 and pressure reducing valve 77.

The system is operated as follows:

Assuming that the proper position of the intermediate aerating device or devices 18 has been determined as described above, air is admitted to the air ring 53 through cutoff valve 61 and reducing valve 52 at approximately three-fourths of the main air pressure. Air is likewise admitted around the screw shaft through the connection 58 at the same pressure. Air is then admitted to the expansion and aerating chamber 16 under control of valve 67 at full pressure. The volume of air admitted at this point is sufficient to aerate the material completely but not in sufficient quantity to maintain the fluent condition throughout the entire length of the system without stratification. The remainder of the required air is then delivered to the intermediate aerating device 18 under control of valve 70 and reducing valve 77. The pump is then started and material conveyed through the system.

Reducing valve 77 is then adjusted to decrease the pressure of the air supplied to the device 18 to a minimum requirement that will overcome stratification and the relative quantities of air admitted through the air ring 53 and the expansion chamber 16 are then adjusted so that the total consumption of power required by the driving motor of the conveying device and for compressing the air reaches the most favorable operating condition. The nozzle 37 within the intermediate aerating device 18 is adjusted in accordance with the pressure of the air admitted so that the air at high velocity passing around the outside of the nozzle reduces back pressure to a minimum. Back pressure is indicated on the pipe line pressure gauge 68.

As no two systems are precisely alike in the quantity and nature of material conveyed, the distance of conveying and elevation, the pressures and volumes of air admitted to the several points noted above are not arbitrary, but must be determined by experiment.

I claim:—

1. A method of conveying pulverulent material which comprises continuously supplying the material to be conveyed to one end of a conveyor conduit, continuously applying pressure to the material as it is so supplied which pressure is transmitted through the material itself so that all the material throughout the conduit is acted on by pressure applied to the material at one end only of the conduit, and increasing the mobility of the material acted on by the pressure by injecting a compressed gas into the material at a point just beyond the point of application of the pressure and by injecting gas at a higher pressure and in greater volume into the material at a distance beyond said first point of injection.

2. A method of conveying pulverulent material which comprises continuously supplying the material to be conveyed to one end of a conveyor conduit, continuously applying pressure to the material as it is so supplied which pressure is transmitted through the material itself so that all the material throughout the conduit is acted on by pressure applied to the material at one end only of the conduit, increasing the mobility of the material acted on by the pressure by injecting a compressed gas into the material at a point just beyond the point of application of the pressure and by injecting gas at a higher pressure and in greater volume into the material at a short distance beyond said first point of injection, and preventing stratification of the material in the conduit by injecting a gas into said material at a substantial distance beyond the point of application of the pressure.

3. The method of conveying pulverulent material which comprises maintaining a column of the material in the conduit from the inlet to the discharge outlet thereof by continuously supplying material at the inlet of the conduit as it is discharged at the outlet, advancing the column through the conduit by subjecting it to pressure applied continuously at the inlet end of the conduit, and rendering the advancing material more fluent by injecting a compressed gas into the material in the conduit at a point adjacent the point of application of pressure, and by injecting gas into the advancing material at a higher pressure and in greater volume at a short distance beyond the first point of injection.

In testimony whereof I affix my signature.
JOSEPH HUMPHREYS MORROW.